US008556119B2

(12) United States Patent
Skavnak et al.

(10) Patent No.: US 8,556,119 B2

(45) Date of Patent: Oct. 15, 2013

(54) HORIZONTAL PRODUCT DISCHARGE SYSTEM FOR A VENDING MACHINE

(75) Inventors: James Skavnak, St. Paul, MN (US); Marlene Skavnak, legal representative, South St. Paul, MN (US); Paul Ihn, Hudson, WI (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 579 days.

(21) Appl. No.: 12/410,263

(22) Filed: Mar. 24, 2009

(65) Prior Publication Data

US 2010/0243666 A1 Sep. 30, 2010

(51) Int. Cl.

| | |
|---|---|
| ***B65G 47/14*** | (2006.01) |
| ***B65G 59/00*** | (2006.01) |
| ***G07F 11/00*** | (2006.01) |

(52) U.S. Cl.

USPC ............... 221/1; 221/174; 221/208; 221/133; 221/130; 221/131; 221/242; 221/312 R; 221/258

(58) Field of Classification Search

USPC ............. 221/1, 174, 208, 133, 130, 131, 242, 221/312 R, 258

See application file for complete search history.

(56) References Cited

U.S. PATENT DOCUMENTS

| | | | | |
|---|---|---|---|---|
| 5,121,854 | A * | 6/1992 | Trouteaud et al. | 221/15 |
| 6,328,180 | B1 * | 12/2001 | Sorensen et al. | 221/131 |
| 6,513,677 | B1 * | 2/2003 | Sorensen et al. | 221/130 |
| 6,755,322 | B1 * | 6/2004 | Herzog et al. | 221/123 |
| 7,222,749 | B2 * | 5/2007 | Holdway et al. | 221/196 |
| 7,451,891 | B2 * | 11/2008 | Carter et al. | 221/210 |
| 7,686,184 | B2 * | 3/2010 | Yuyama et al. | 221/210 |
| 7,802,700 | B2 * | 9/2010 | Ardern et al. | 221/258 |
| 7,904,199 | B2 * | 3/2011 | Carter et al. | 700/242 |
| 8,162,174 | B2 * | 4/2012 | Hieb et al. | 221/210 |
| 2006/0169714 | A1 * | 8/2006 | Holdway et al. | 221/289 |
| 2008/0179343 | A1 * | 7/2008 | Perkins et al. | 221/208 |
| 2010/0243666 | A1 * | 9/2010 | Skavnak et al. | 221/1 |
| 2011/0068116 | A1 * | 3/2011 | Ardern et al. | 221/1 |

* cited by examiner

*Primary Examiner* — Gene O. Crawford
*Assistant Examiner* — Rakesh Kumar

(57) ABSTRACT

A system and method for discharging a selected product into a dispensing chamber of a vending machine are provided. In the system and method of this disclosure, a selected product from a vending machine is received in a product delivery cup. The product delivery cup is moved to a dispensing chamber of the vending machine. Near the dispensing chamber, the product delivery cup moves in a horizontal direction which causes or activates a delivery cup sleeve within the product delivery cup to pivot or move from a non-dispensing position to a dispensing position. The dispensing position of the delivery cup sleeve releases the selected product from the delivery cup sleeve to the dispensing chamber where a consumer is able to access the selected product.

18 Claims, 8 Drawing Sheets

HORIZONTAL PRODUCT DISCHARGE SYSTEM FOR A VENDING MACHINE

TECHNICAL FIELD

This disclosure pertains of vending machines and, more particularly, to a product delivery and dispensing system that releases a selected product into a dispensing chamber for delivery to a consumer.

BACKGROUND

Vending machines for dispensing canned or bottled beverages or other products have long been known. Early model vending machines released similarly sized bottles, one at a time, following the deposit of a required purchase amount. In order to withdraw the selected bottle from the vending machine, a purchaser was required, for example, to slide the bottle along a track until the selected bottle reached a release point, at which time the bottle could be removed from the machine. While effective, differences in bottle design, size, and shape made it necessary to develop product-specific vending machines. However, as the packaging of beverages in cans gained in popularity, the standardization of product containers brought on through the use of beverage cans made vending simpler. As a result, many vending machine designs employed serpentine tracks that increased storage capacity and improved the overall efficiency of the vending operation.

Presently, product containers are once again available in various different sizes and shapes. Also, specialty beverages, such as sports and energy drinks, flavored teas, fruit juices, milk and the like, are growing in popularity. Typically, these beverages are packaged in glass or plastic bottles that have unique shapes, which are associated with the particular product. Given the wide variety of container sizes, mechanisms for delivering a selected product to a consumer must be readily adaptable or capable of accommodating a large number of different products.

At present, transport mechanisms that transition in multiple planes to deliver a selected product to a consumer are growing in popularity. Typically, the selected product is either retrieved from a shelf or allowed to pass into a carrier portion of the transport mechanism, whereupon the carrier is shifted towards a dispensing area.

Once at the dispensing area, the product must be discharged from the transport carrier. Various mechanisms have been employed to discharge a selected product from a transport carrier into a dispensing area. In one example, the product is simply ejected from the transport carrier and allowed to fall within the vending machine cabinet into the dispensing area.

SUMMARY

This disclosure provides a system and method for discharging a selected product into a dispensing chamber of a vending machine.

In a first embodiment, a vending machine for storing and selectively dispensing products includes a delivery cup sleeve for receiving a selected product, and a product transport system for moving the delivery cup sleeve to a dispensing chamber of the vending machine. The delivery cup sleeve releases the selected product to the dispensing chamber in response to a horizontal movement of the product transport system.

In particular embodiments, the delivery cup sleeve pivots to release the selected product to the dispensing chamber.

In other particular embodiments, the delivery cup sleeve pivots to release the selected product upon the product transport system contacting an activation structure.

In yet other particular embodiments, the delivery cup sleeve pivots to release the selected product upon a linkage of the product transport system contacting a fixed activation structure near the dispensing chamber.

In still other particular embodiments, the selected product is released to the dispensing chamber through a delivery port.

In additional particular embodiments, a delivery port door is engaged by the delivery cup sleeve to access the dispensing chamber through the delivery port.

In further particular embodiments, the delivery cup sleeve is pivoted by a tip plate.

In a second embodiment, a product delivery cup for use in a vending machine includes a delivery cup sleeve for receiving a selected product, and a tip plate for moving the delivery cup sleeve from a first non-dispensing position to a second dispensing position. The tip plate moves the delivery cup sleeve to the second dispensing position in response to a horizontal movement of the product delivery cup.

In a third embodiment, a method of dispensing a selected product from a vending machine includes receiving the selected product in a delivery cup sleeve, moving the delivery cup sleeve to a dispensing chamber of the vending machine by a product transport system, and moving the delivery cup sleeve from a first non-dispensing position to a second dispensing position in response to a horizontal movement of the product transport system. The second dispensing position of the delivery cup sleeve releases the selected product from the delivery cup sleeve to the dispensing chamber.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present disclosure are by way of illustration only and should not be construed in any way to limit the scope of the invention. Those skilled in the art will understand that these principles may be implemented in any type of suitably arranged device or system.

This disclosure describes a method and system for dispensing a product from a transport carrier. The method and system of this disclosure allow a product to be dispensed by a horizontal movement of the transport carrier.

Figure 1:
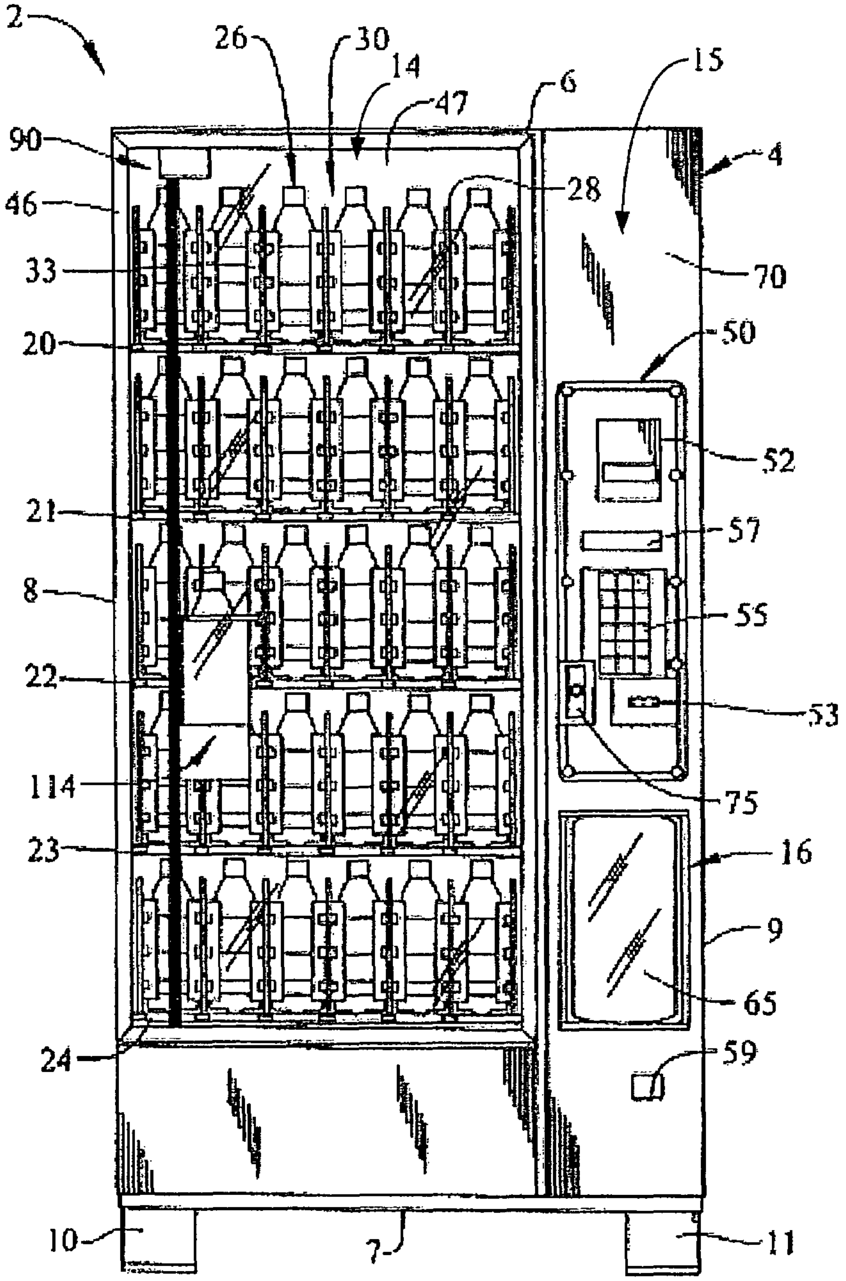
FIG. 1 illustrates a vending machine according to an embodiment of this disclosure.
Figure 2:
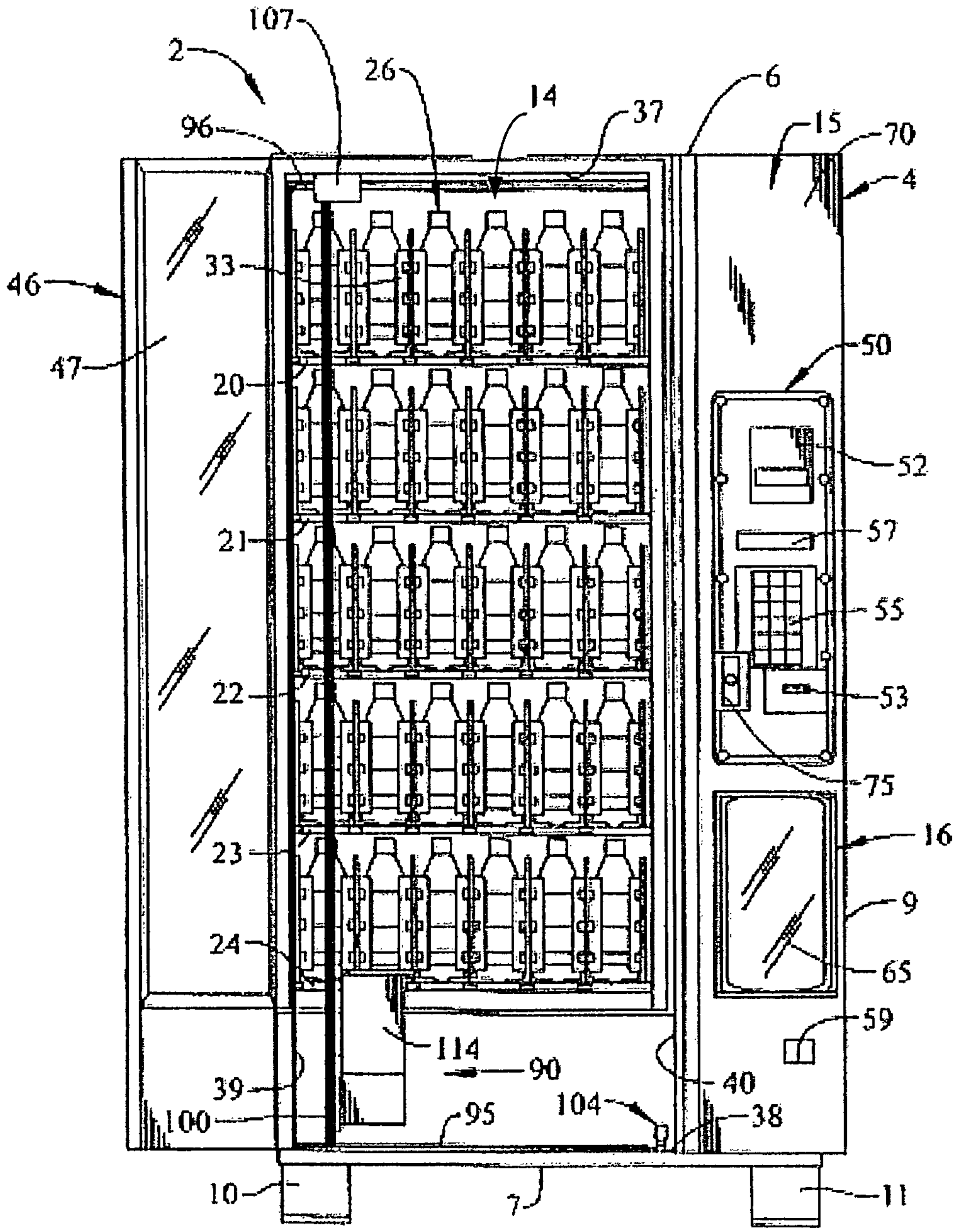
FIG. 2 further illustrates the vending machine according to an embodiment of this disclosure.

Referring FIGS. 1 and 2, a vending machine generally indicated at 2 includes a cabinet 4. As shown, cabinet 4 includes top, bottom and opposing side walls 6, 7, 8, and 9. Arranged below bottom wall 7 are various leg members 10 and 11 for positioning vending machine 2 upon a supporting surface (not shown). In the embodiment shown, vending machine 2 is divided into a plurality of zones with each zone being associated with a particular portion of a vending operation. Towards that end, vending machine 2 includes a storage and display zone 14, a currency receiving zone 15, and a dispensing zone 16.

As shown, storage/display zone 14 is provided with a plurality of product support shelves 20-24 for supporting and displaying a plurality of product containers. Several product containers are shown, with one identified by reference numeral 26. Preferably, each of the plurality of product support shelves 20-24 is mounted at a downwardly and forwardly extending shelf angle to ensure that product containers move forward following a vend operation. In addition, each of the plurality of product support shelves 20-24 includes a plurality of dividers creating a plurality of product queues. One of the dividers is indicated by reference numeral 28, and one of the product queues created by the dividers is indicated by reference numeral 30 on product support shelf 20.

Each of the plurality of product queues 30 includes an integrated dispensing or escapement unit 33. In some embodiments, integrated dispensing unit 33 is mounted at a front end (not separately labeled) of each of the plurality of dividers 28 and is selectively activated to release a product container 26 from storage/display zone 14 for delivery to a consumer. In a manner known in the art, storage/display zone 14 includes top, bottom and opposing side walls 37, 38, 39, and 40 and is provided with a door 46 having a glass panel 47 to enable a consumer to view and choose between the variety of product containers 26 carried within vending machine 2.

Arranged alongside (adjacent) storage/display zone 14 is currency receiving zone 15. In the embodiment shown, currency receiving zone 15 includes a currency receiving center 50 for inputting currency deposited by the consumer during a vend transaction. Currency receiving center 50 includes a bill acceptor/validator 52, a multi-price coin mechanism 53 and a key pad 55 for inputting product selections. Currency receiving center 50 also includes a display 57 for providing information to the consumer, as well as validating the particular selection made. Finally, a coin return slot 59 is provided for returning any required change to the consumer at the completion of a vend operation. Arranged below currency receiving zone 15, dispensing zone 16 includes a dispensing chamber 65 that enables a consumer to remove a dispensed product from vending machine 2. In the embodiment shown, currency receiving zone 15 and dispensing zone 16 are provided on a door 70 that overlaps door 46 and, therefore, is opened prior to opening door 46. To this end, in some embodiments, door 70 is provided with a lock 75 that prevents unauthorized access to within vending machine 2.

In accordance with this disclosure, vending machine 2 includes a product transport and delivery system 90 that receives one of the plurality of product containers 26 from one of the plurality of product queues 30 and transports the selected product towards delivery chamber 65 for receipt by the consumer.

As shown in FIG. 2, product transport system 90 includes a first, laterally extending guide rail 95 arranged on lower wall 38 of product storage zone 14, a second, laterally extending guide rail 96 arranged on upper wall 37 and an upstanding (vertically oriented) carriage rail 100 that extends along storage/delivery zone 14 between first and second guide rails 95 and 96. Product transport system 90 also includes a first or horizontal axis translation mechanism 104 for shifting carriage rail 100 between the plurality of product queues 30 (e.g., right and left) and a second or vertical axis translation mechanism 107 that selectively shifts a product delivery cup 114 that is slidably supported by carriage rail 100 between the plurality of product shelves 20-24 (e.g., up and down).

Product transport system 90 shifts (moves) product delivery cup 114 along multiple axes to receive and transport a selected product container 26 from one of the plurality of product queues 30 towards dispensing chamber 65. Once at dispensing chamber 65, the selected product container 26 is discharged from product delivery cup 114 into dispensing chamber 65 for access by the consumer.

Figure 3:
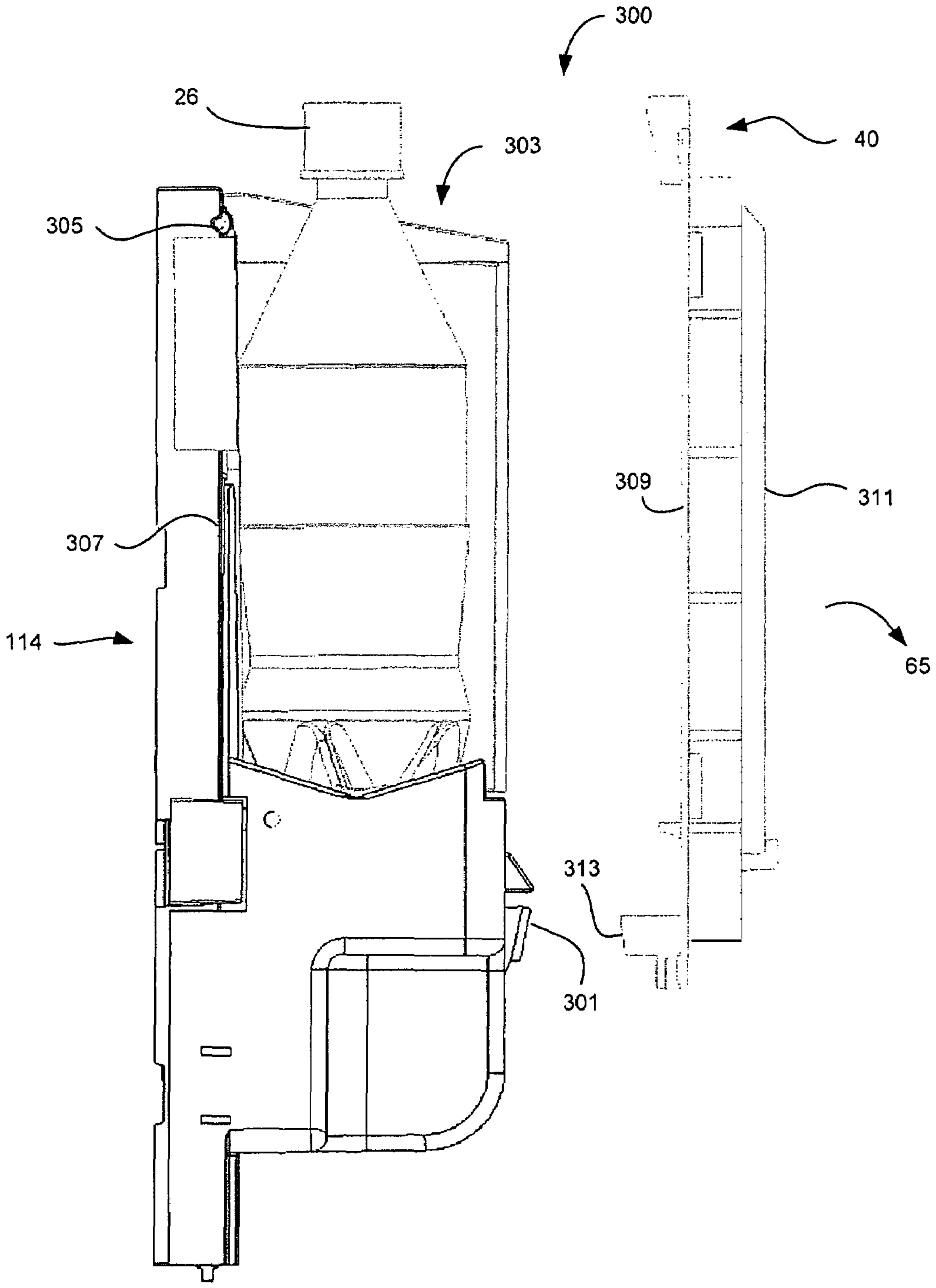
FIG. 3 illustrates a horizontal product delivery system at an initial position according to an embodiment of this disclosure.

FIG. 3 illustrates a horizontal product delivery system 300 at an initial position according to an embodiment of this disclosure.

In this embodiment, product delivery cup 114 includes a horizontal product delivery (HPD) linkage 301 shown at a first, unengaged position. Product delivery cup 114 is also shown having a horizontal delivery cup sleeve 303, which pivots about a fixed point 305. Behind horizontal delivery cup sleeve 303 is a tip plate 307 also shown in a first, unengaged position. FIG. 3 also shows a part of side wall 40 and dispensing chamber 65. Side wall 40 is shown as having a delivery port 309 with a delivery port door 311 in a first, unengaged position covering delivery port 309. Along side wall 40 and below delivery port 309 is an activation block 313. The delivery port 309 is positioned adjacent to dispensing chamber 65.

Figure 4:
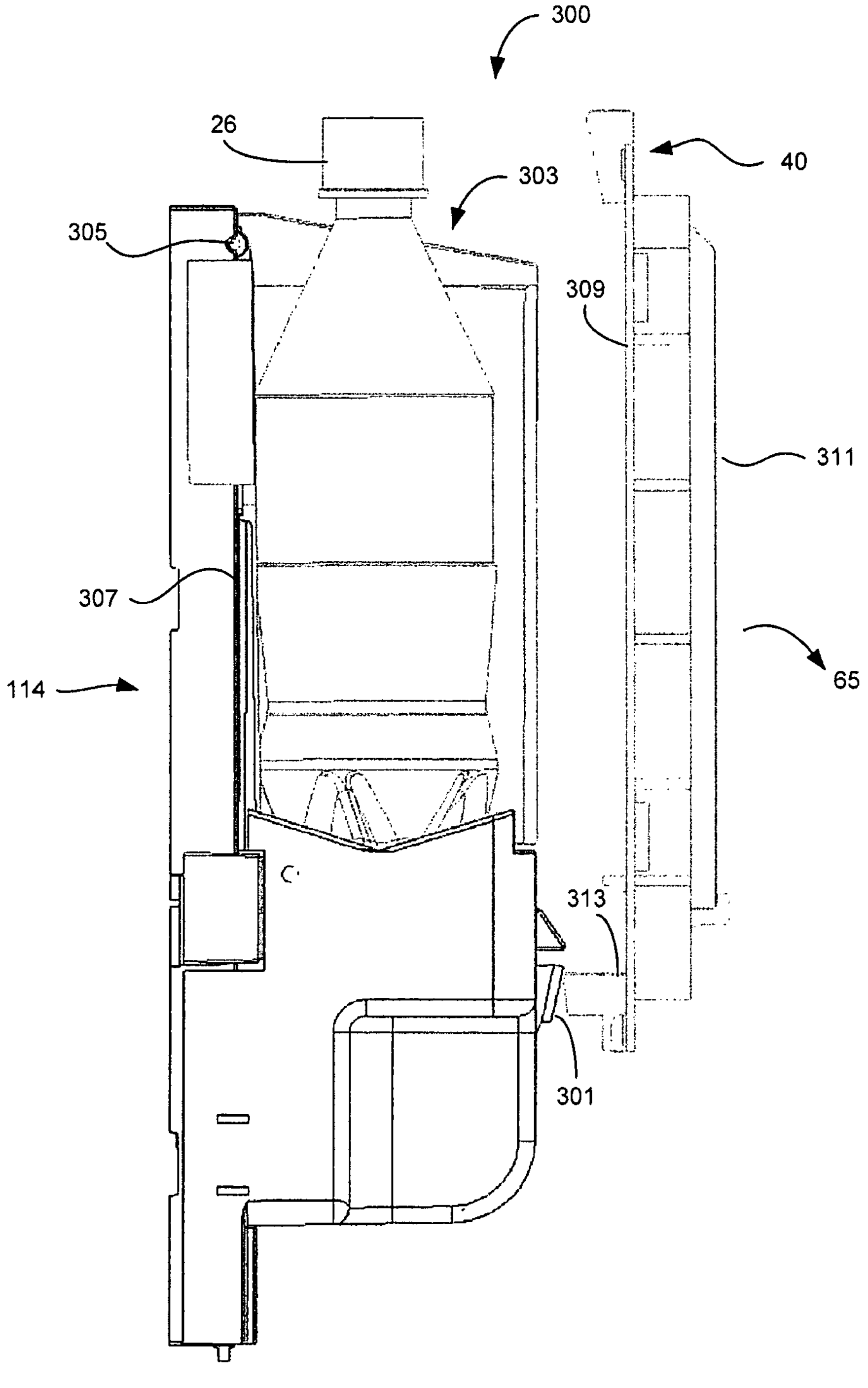
FIG. 4 illustrates a horizontal product delivery system moved in a horizontal direction according to an embodiment of this disclosure.

FIG. 4 illustrates the horizontal product delivery system 300 moved in a horizontal direction according to an embodiment of this disclosure.

As shown in FIG. 4, product delivery cup 114 is moved in a horizontal direction towards side wall 40 bringing HDP linkage 301 into closer contact with activation block 313.

Figure 5:
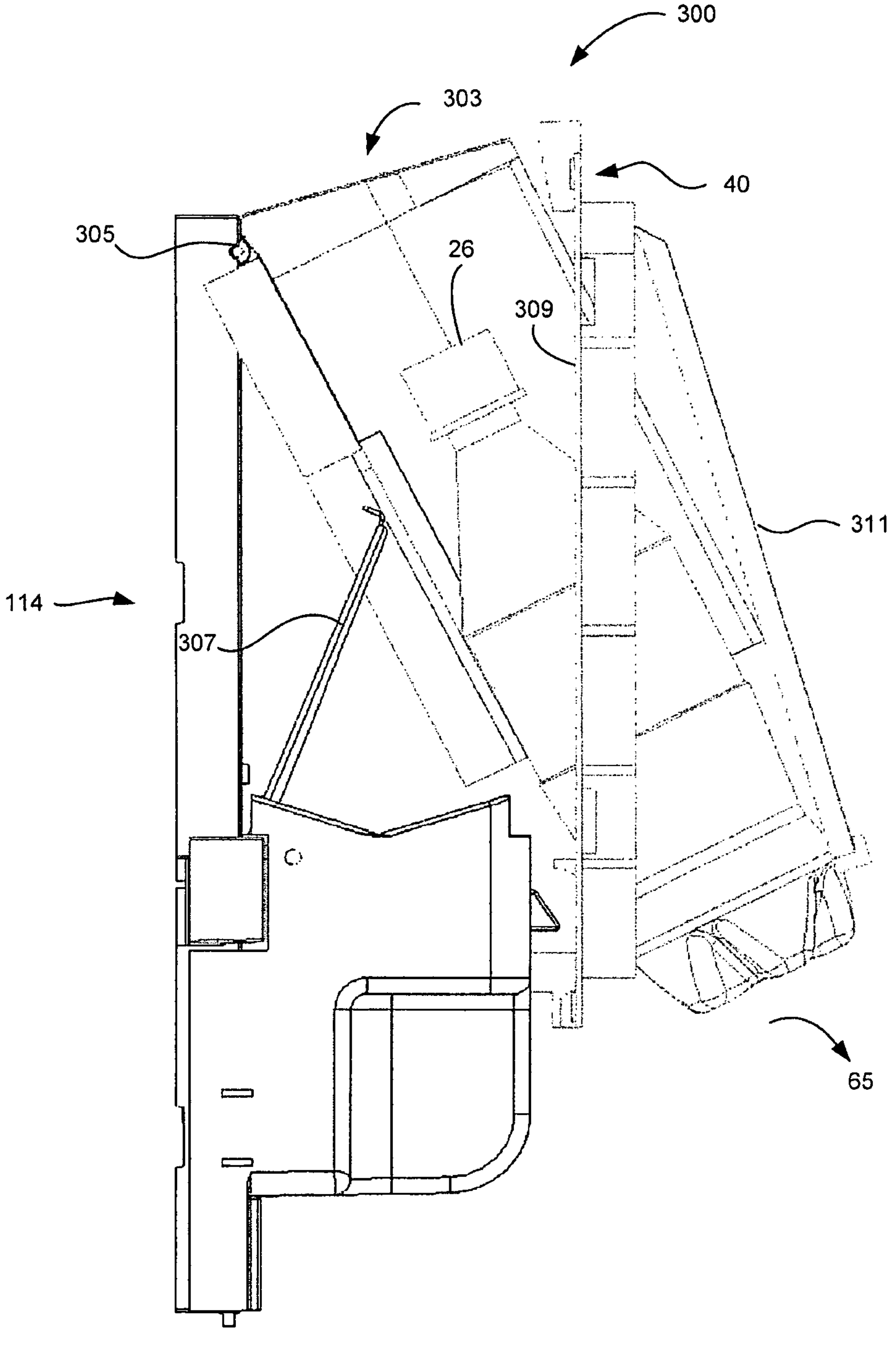
FIG. 5 illustrates a horizontal product delivery system dispensing a product container according to an embodiment of this disclosure.

FIG. 5 illustrates the horizontal product delivery system 300 dispensing a product container according to an embodiment of this disclosure.

In this embodiment, product delivery cup 114 has moved in a horizontal direction to a point where activation block 313 comes into contact with product delivery cup 114 at HDP linkage 301. In this embodiment, HDP linkage 301 has been moved to a second, engaged position by activation block 313 and is not visible in the second position from this view. The movement of HDP linkage from the first position to the second position causes tip plate 307 to move from the first, unengaged position to a second, engaged position. The second, engaged position of tip plate 307 causes horizontal delivery cup sleeve 303 to pivot about fixed pivot 305 from a first, non-dispensing position to a second, dispensing position.

The second, dispensing position causes horizontal delivery cup sleeve 303 to press against delivery port door 311. This movement of delivery cup sleeve 303 in turn causes delivery port door 311 to move from the first, unengaged position (closed) to a second, engaged (open) position allowing access to dispensing chamber 65. Once delivery cup sleeve 303 is in the second, dispensing position allowing access to dispensing chamber 65, selected product container 26 drops through an open bottom portion of delivery cup sleeve 303 and into dispensing chamber 65. A consumer is then able to access selected product container 26 in dispensing chamber 65.

Accordingly, selected product container 26 is dispensed into dispensing chamber 65 in response to a horizontal movement of product delivery cup 114 (movement in a horizontal direction).

Figure 6:
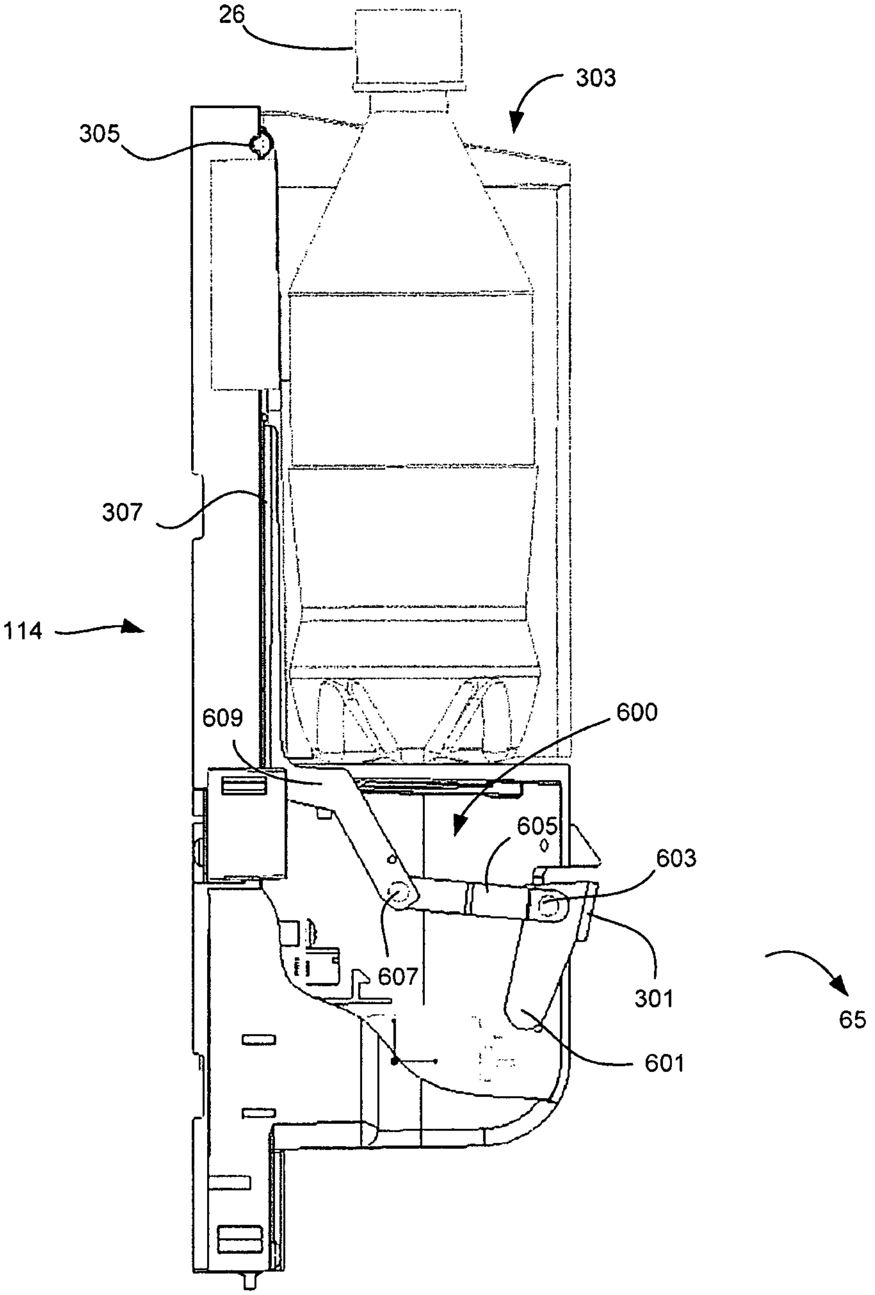
FIG. 6 illustrates a dispensing mechanism in an unengaged position according to an embodiment of this disclosure.

FIG. 6 illustrates a dispensing mechanism 600 in an unengaged position according to an embodiment of this disclosure.

As shown in this embodiment, HDP linkage 301 is not engaged by an activation structure, such as activation block 313, and pivots about a fixed point 601 and a floating pivot 603. A tip plate link 605 is coupled to HDP linkage 301 via floating pivot 603 at a first end and is coupled to tip plate 307 via a floating pivot 607 at a second end. Tip plate 307 pivots about floating pivot 607 and a fixed pivot 609.

In this unengaged position, horizontal delivery cup sleeve 303 is in a non-dispensing position, and selected product container 26 remains inside delivery cup sleeve 303.

Figure 7:
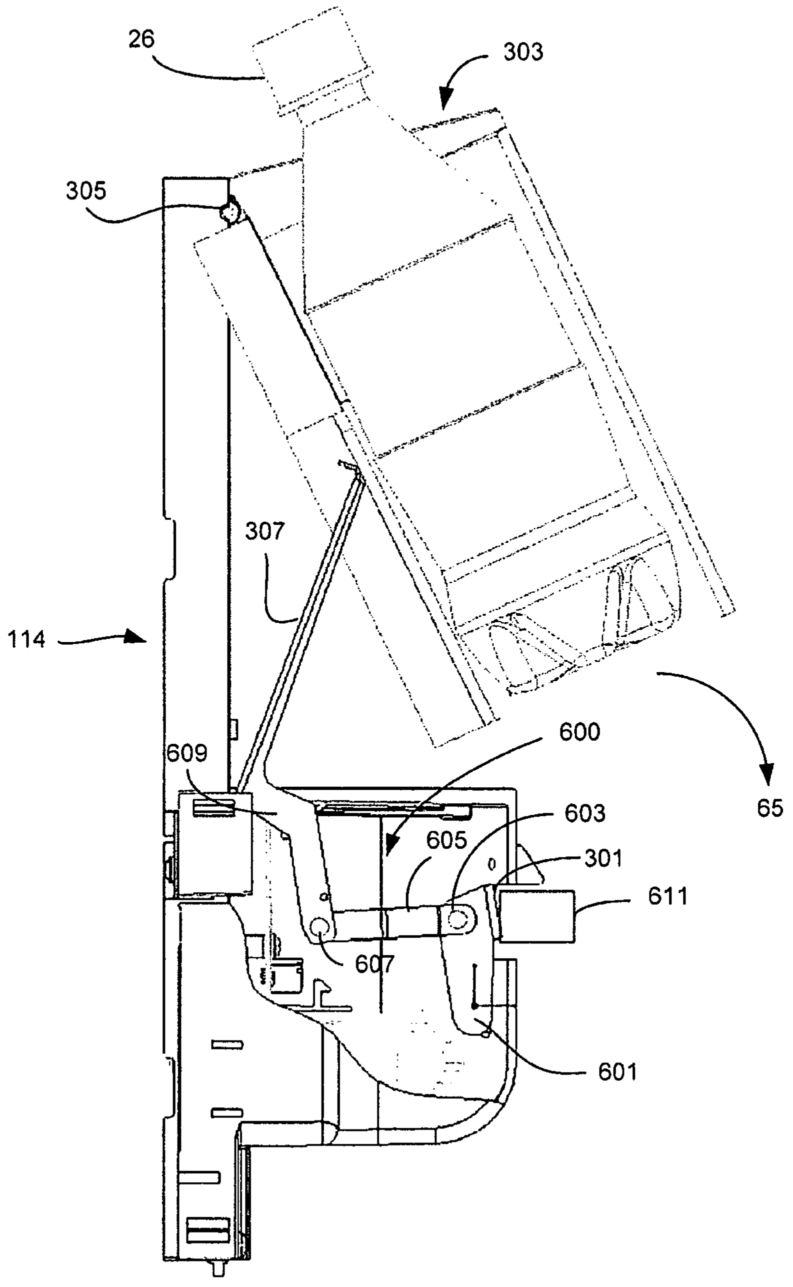
FIG. 7 illustrates a dispensing mechanism in an engaged position according to an embodiment of this disclosure.

FIG. 7 illustrates the dispensing mechanism 600 in an engaged position according to an embodiment of this disclosure.

In this embodiment, horizontal delivery cup sleeve 303 is engaged by an activation structure 611, such as activation block 313. As shown in FIG. 7, engagement by an activation structure causes HDP linkage 301 to move horizontally by pivoting about fixed pivot 601 and floating pivot 603. The horizontal motion of HDP linkage 301 causes tip plate link 605 also to move horizontally by pivoting about floating pivots 603 and 607. The horizontal motion of tip plate link 605 in turn causes tip plate 307 to pivot about floating pivot 607 and fixed pivot 609, thus causing tip plate 307 to move from a first, unengaged position to a second, engaged position, as shown. Accordingly, HDP linkage 301 functions as a tip plate actuator.

The second, engaged position of tip plate 307 causes the horizontal movement of delivery cup sleeve 303 into a dispensing position and selected product container 26 to drop through an open bottom portion of delivery cup sleeve 303 into dispensing chamber 65.

Figure 8:
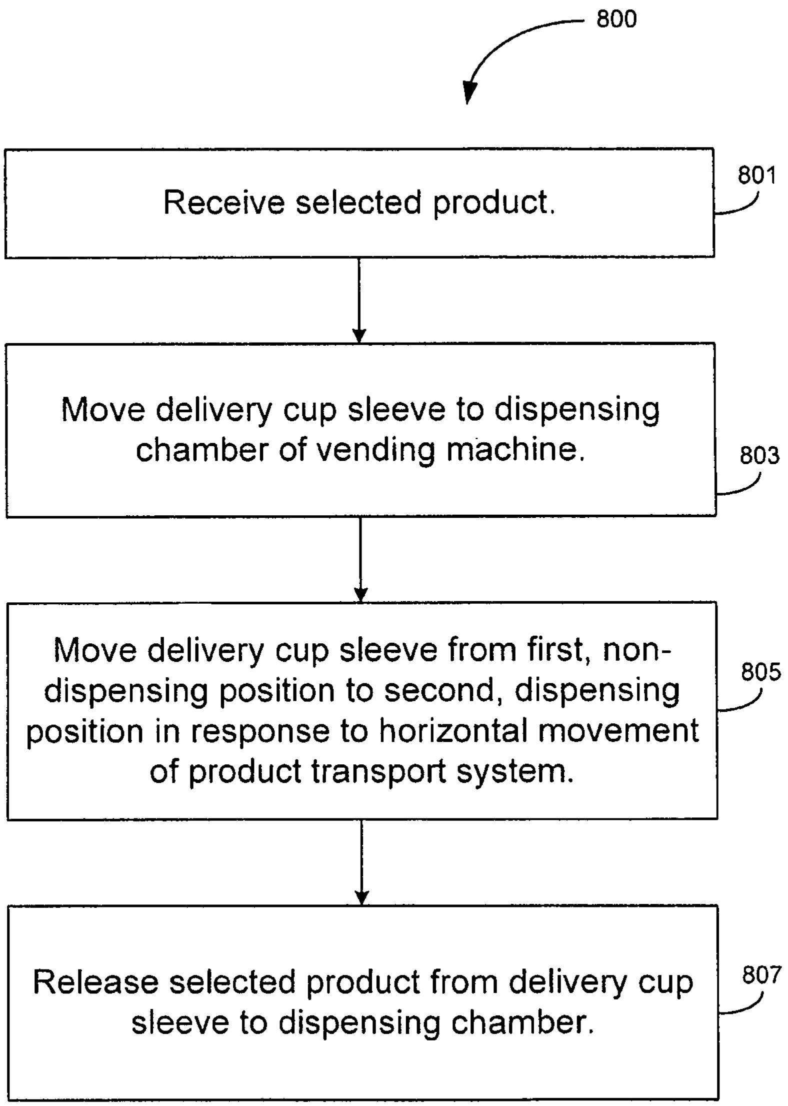
FIG. 8 illustrates a method of dispensing a selected product from a vending machine.

FIG. 8 illustrates a method 800 of dispensing a selected product from a vending machine.

As shown in FIG. 8, the delivery cup sleeve 303 receives a selected product, such as product 26 (Block 801). Product transport system 90 moves the delivery cup sleeve 303 to dispensing chamber 65 of vending machine 2 (Block 803). Delivery cup sleeve 303 is then moved from a first, non-dispensing position to a second, dispensing position in response to a horizontal movement of product transport system 90(Block 805).

In one embodiment, the horizontal movement of product transport system 90 causes linkage 301 of product transport system 90 to come into contact with an activation structure, such as activation block 313, along a wall of vending machine 2. The engagement by the activation structure causes delivery cup sleeve 303 to move from the first, non-dispensing position to the second, dispensing position.

The second, dispensing position of delivery cup sleeve 303 releases the selected product from delivery cup sleeve 303 to dispensing chamber 65 where a consumer is able to access the selected product (Block 807).

It may be advantageous to set forth definitions of certain words and phrases used throughout this disclosure. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A vending machine for storing and selectively dispensing products, the vending machine comprising:
- a delivery cup assembly having:
  - a movable delivery cup sleeve and configured to receive a selected product, and
  - a pivotable tip plate configured to shift the delivery cup sleeve when moved; and
- a product transport system configured to move the delivery cup assembly with the selected product toward a dispensing chamber of the vending machine,
- wherein the delivery cup sleeve is configured to pivot to release the selected product from the delivery cup assembly into the dispensing chamber in response to contact of a portion of the tip plate with an activation structure as a result of horizontal-only translation of the delivery cup assembly by the product transport system.

2. A vending machine in accordance with claim 1, wherein the activation structure is fixed near the dispensing chamber and wherein the delivery cup sleeve is configured to pivot to release the selected product as a result of the horizontal-only translation of the delivery cup assembly relative to the activation structure.

3. A vending machine in accordance with claim 1, wherein the dispensing chamber is configured to receive the released selected product through a delivery port.

4. A vending machine in accordance with claim 3, wherein a delivery port door blocking the delivery port is configured to be engaged and moved by a portion of the delivery cup sleeve to allow access to the dispensing chamber through the delivery port.

5. A vending machine in accordance with claim 3, wherein the delivery cup sleeve is configured to be pivoted by the tip plate having a portion extending adjacent to a surface of the delivery cup sleeve opposite the delivery port.

6. A product delivery system for use in a vending machine, the product delivery system comprising:
- a transport mechanism; and
- a product delivery cup assembly coupled to and selectively movable by the transport mechanism and configured to receive a selected product, the product delivery cup assembly including
  - a movable delivery cup sleeve, and
  - a tip plate for moving the delivery cup sleeve from a first non-dispensing position to a second dispensing position during horizontal-only translation of the product delivery cup assembly by the transport mechanism, bringing a portion of the tip plate into contact with an activation structure and moving the tip plate as a result of the contact.

7. The product delivery system in accordance with claim 6, wherein the tip plate is configured to move the delivery cup sleeve to the second dispensing position by pivoting the delivery cup sleeve.

8. The product delivery system in accordance with claim 6, wherein the tip plate is configured to move the delivery cup sleeve to the second dispensing position in response to the product delivery cup contacting the activation structure.

9. The product delivery system in accordance with claim 6, wherein the tip plate is configured to move the delivery cup sleeve to the second dispensing position in response to the horizontal-only translation of the product delivery cup assembly subsequent to contact of the portion of the tip plate with the activation structure.

10. A product delivery system in accordance with claim 9, wherein in response to the horizontal-only translation of the product delivery cup assembly relative to the activation structure, a tip plate link causes a portion of the tip plate extending adjacent to a surface of the delivery cup sleeve opposite a delivery port to pivot the delivery cup sleeve to the second dispensing position.

11. A product delivery system in accordance with claim 6, wherein the product delivery cup assembly is configured to release the selected product into a dispensing chamber through a delivery port when the delivery cup sleeve is moved to the second dispensing position.

12. A method of dispensing a selected product from a vending machine, the method comprising:

receiving the selected product in a delivery cup assembly having a delivery cup sleeve;

moving the delivery cup toward a dispensing chamber of the vending machine with a product transport system;

moving the delivery cup sleeve from a first non-dispensing position to a second dispensing position during horizontal-only translation of the delivery cup assembly by the product transport system; and releasing the selected product from the delivery cup sleeve to the dispensing chamber in response to movement of the delivery cup sleeve from the first non-dispensing position to a second dispensing position.

13. The method in accordance with claim 12, wherein the delivery cup sleeve pivots from the first non-dispensing position to the second dispensing position.

14. The method in accordance with claim 12, wherein a tip plate pivots the delivery cup sleeve from the first non-dispensing position to the second dispensing position.

15. The method in accordance with claim 12, wherein the horizontal-only translation of the product delivery cup assembly causes a portion of the tip plate to contact an activation structure.

16. The method in accordance with claim 15, wherein the horizontal-only translation of the product delivery cup assembly by the product transport system subsequent to contact of the portion of the tip plate with the activation structure causes rotation of the tip plate.

17. The method in accordance with claim 12, wherein the selected product is released from the delivery cup assembly into the dispensing chamber through a delivery port.

18. The method in accordance with claim 17, wherein a delivery port door blocking the delivery port is engaged and moved by a portion of the delivery cup sleeve to allow access to the dispensing chamber through the delivery port to allow access to the dispensing chamber through the delivery port.

* * * * *